(12) United States Patent
Takaki et al.

(10) Patent No.: US 11,920,523 B2
(45) Date of Patent: Mar. 5, 2024

(54) COMBUSTION CONTROL DEVICE FOR GAS TURBINE, COMBUSTION CONTROL METHOD, AND PROGRAM

(71) Applicant: Mitsubishi Power, Ltd., Kanagawa (JP)

(72) Inventors: Kazushige Takaki, Tokyo (JP); Makoto Kishi, Tokyo (JP); Takahiko Sakaki, Yokohama (JP); Kotaro Miyauchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 71 days.

(21) Appl. No.: 17/614,142

(22) PCT Filed: Aug. 6, 2020

(86) PCT No.: PCT/JP2020/030127
§ 371 (c)(1),
(2) Date: Nov. 24, 2021

(87) PCT Pub. No.: WO2021/033559
PCT Pub. Date: Feb. 25, 2021

(65) Prior Publication Data
US 2022/0228532 A1 Jul. 21, 2022

(30) Foreign Application Priority Data
Aug. 22, 2019 (JP) .................................. 2019-152176

(51) Int. Cl.
*F02C 9/18* (2006.01)
*F02C 9/28* (2006.01)
(Continued)

(52) U.S. Cl.
CPC .................. *F02C 9/28* (2013.01); *F02C 9/18* (2013.01); *F02C 9/263* (2013.01); *F02C 9/52* (2013.01);
(Continued)

(58) Field of Classification Search
CPC ...... F02C 9/16; F02C 9/18; F02C 9/28; F02C 9/26; F02C 9/266; F02C 9/263; F02C 6/08; F02C 9/52; F02C 9/50; F05D 2270/021
See application file for complete search history.

(56) References Cited

U.S. PATENT DOCUMENTS 3,623,326 A 12/1969 Greune
3,978,658 A * 9/1976 Forbes ...................... F02C 9/18
60/39.27
(Continued)

FOREIGN PATENT DOCUMENTS

DE 1816414 10/1970
DE 10 2006 008 714 3/2007
(Continued)

OTHER PUBLICATIONS

International Search Report dated Nov. 10, 2020 in International (PCT) Application No. PCT/JP2020/030127.

*Primary Examiner* — Thuyhang N Nguyen
(74) *Attorney, Agent, or Firm* — Wenderoth, Lind & Ponack, L.L.P.

(57) ABSTRACT

A combustion control device including a bleed valve control unit for controlling a bleed valve disposed on a bleed pipe for performing bleeding so that a part of the compressed air flowing into the casing is not used as combustion air in the combustor, a fuel control unit for controlling a fuel regulating valve for regulating a fuel flow rate of fuel supplied to the combustor, and a temperature acquisition unit. Upon reception of a load rejection signal for cutting off a load from the gas turbine, the bleed valve control unit controls a valve opening degree of the bleed valve from a closed state to an open state with a prescribed opening degree, and the fuel control unit controls the fuel regulating valve such that the acquired flame temperature falls within a predetermined temperature range defined by an upper limit value and a lower limit value.

8 Claims, 7 Drawing Sheets

(51) Int. Cl.
*F02C 9/52* (2006.01)
*F02C 9/26* (2006.01)
(52) U.S. Cl.
CPC .... *F05D 2240/35* (2013.01); *F05D 2270/303* (2013.01)

(56) References Cited

U.S. PATENT DOCUMENTS

| | | | |
|---|---|---|---|
| 7,707,814 B2* | 5/2010 | Sonoda | F02C 9/28 60/243 |
| 2007/0079593 A1 | 4/2007 | Fujii et al. | |
| 2014/0060066 A1 | 3/2014 | Hesse | |
| 2014/0165583 A1* | 6/2014 | Oliverio | F02C 9/52 60/776 |
| 2015/0292416 A1* | 10/2015 | Koganezawa | F01D 15/10 60/734 |
| 2017/0074175 A1* | 3/2017 | Uyama | F02C 7/04 |

FOREIGN PATENT DOCUMENTS

| | | |
|---|---|---|
| DE | 11 2015 001 394 | 12/2016 |
| JP | 5147766 | 2/2013 |
| JP | 5746361 | 7/2015 |
| JP | 2017-106324 | 6/2017 |
| JP | 2018-178803 | 11/2018 |

\* cited by examiner

COMBUSTION CONTROL DEVICE FOR GAS TURBINE, COMBUSTION CONTROL METHOD, AND PROGRAM

TECHNICAL FIELD

The present disclosure relates to combustion control for a gas turbine in load rejection.

BACKGROUND

In a gas turbine plant for power generation, load rejection of cutting off a load may be performed during a load operation. An operation after the load rejection is regarded as success if there is no flame off in a combustor and a rotation speed of a gas turbine is, for example, not greater than 110% of an overspeed trip (to be referred to as OST, hereinafter) prescribed value. In order to make the operation after load rejection succeed, it is necessary to prevent flame off by increasing the air-fuel ratio by, for example, supplying much fuel. However, the above-described rotation speed is increased in accordance with the supply amount of the fuel, increasing possibility of OST. Meanwhile, although OST is reliably avoided as the supply amount of the fuel decreases, flame off occurs if the air-fuel ratio is too low due to the small supply amount of the fuel, which may stop the gas turbine.

For example, Patent Document 1 discloses suppressing a decrease in rotation speed of a gas turbine by controlling an opening degree of an inlet guide vane (IGV) and a valve opening degree of a bleed valve for bleeding compressed air from a compressor in load rejection. Further, Patent Document 2 discloses that in load rejection, a combustion control device controls an injection amount (fuel supply flow rate) from a fuel nozzle of a combustor to not greater than a threshold for preventing the rotation speed of the gas turbine from exceeding 110% of the OST prescribed value, and controls a bypass valve (bleed valve) on a bleed pipe for bleeding compressed air from a casing from a closed state to an open state. Thus, since the amount of the compressed air supplied to the fuel nozzle (air supply flow rate) is decreased by bleeding of the compressed air from the casing performed in load rejection, it is possible to increase the air-fuel ratio in the combustor without increasing the fuel supply flow rate into the combustor. Therefore, it is possible to prevent flame off by increasing the air-fuel ratio without consuming wasteful fuel, while preventing occurrence of OST by supplying fuel of the amount that does not cause OST. Patent Document 3 discloses an estimation method for a flame temperature on the basis of an operating condition of a gas turbine.

CITATION LIST

Patent Literature

Patent Document 1: JP5147766B
Patent Document 2: JP2017-106324A
Patent Document 3: JP2018-178803A

SUMMARY

Technical Problem

As described above, in load rejection of the gas turbine, prevention of flame off is required while preventing an excessive increase in rotation speed of the gas turbine. In Patent Document 2 described above, the air-fuel ratio, which is the ratio of the fuel supply flow rate to the air supply flow rate, is used as a control reference for preventing flame off, and in order to more accurately determine combustion stability in the combustor as well as to prevent damage to equipment due to the overhigh flame temperature, a method is required which performs combustion control in load rejection based the flame temperature.

In view of the above, an object of at least one embodiment of the present invention is to provide a combustion control device capable of appropriately performing an operation of the gas turbine in load rejection while preventing damage to equipment due to flame.

Solution to Problem

A combustion control device for a gas turbine according to at least one embodiment of the present invention is a combustion control device for a gas turbine for supplying, to a combustor, compressed air by a compressor flowing into a casing, the device including a bleed valve control unit configured to control a bleed valve disposed on a bleed pipe for performing bleeding so that a part of the compressed air flowing into the casing is not used as combustion air in the combustor, a fuel control unit configured to control a fuel regulating valve for regulating a fuel flow rate of fuel supplied to the combustor, and a temperature acquisition unit configured to acquire a flame temperature of flame caused by combustion of the fuel in the combustor. Upon reception of a load rejection signal for cutting off a load from the gas turbine, the bleed valve control unit controls a valve opening degree of the bleed valve from a closed state to an open state with a prescribed opening degree, and the fuel control unit controls the fuel regulating valve such that the acquired flame temperature falls within a predetermined temperature range defined by an upper limit value and a lower limit value.

A combustion control method for a gas turbine according to at least one embodiment of the present invention is a combustion control method for a gas turbine for supplying, to a combustor, compressed air by a compressor flowing into a casing, the method including a bleed valve control step of controlling a bleed valve disposed on a bleed pipe for performing bleeding so that a part of the compressed air flowing into the casing is not used as combustion air in the combustor, a fuel control step of controlling a fuel regulating valve for regulating a fuel flow rate of fuel supplied to the combustor, and a temperature acquisition step of acquiring a flame temperature of flame caused by combustion of the fuel in the combustor. Upon reception of a load rejection signal for cutting off a load from the gas turbine, the bleed valve control step includes controlling a valve opening degree of the bleed valve from a closed state to an open state with a prescribed opening degree, and the fuel control step includes controlling the fuel regulating valve such that the acquired flame temperature falls within a predetermined temperature range defined by an upper limit value and a lower limit value.

A combustion control program for a gas turbine according to at least one embodiment of the present invention is a combustion control program for a gas turbine for supplying, to a combustor, compressed air by a compressor flowing into a casing, the program including in a computer a bleed valve control unit configured to control a bleed valve disposed on a bleed pipe for performing bleeding so that a part of the compressed air flowing into the casing is not used as combustion air in the combustor, a fuel control unit configured to control a fuel regulating valve for regulating a fuel flow rate of fuel supplied to the combustor, and a temperature acquisition unit configured to acquire a flame temperature of flame caused by combustion of the fuel in the combustor. Upon reception of a load rejection signal for cutting off a load from the gas turbine, the program causes the computer to implement such that the bleed valve control unit controls a valve opening degree of the bleed valve from a closed state to an open state with a prescribed opening degree, and the fuel control unit controls the fuel regulating valve such that the acquired flame temperature falls within a predetermined temperature range defined by an upper limit value and a lower limit value.

Advantageous Effects

According to at least one embodiment of the present invention, a combustion control device is provided which is capable of appropriately performing an operation of a gas turbine in load rejection while preventing damage to equipment due to flame.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Figure 1:
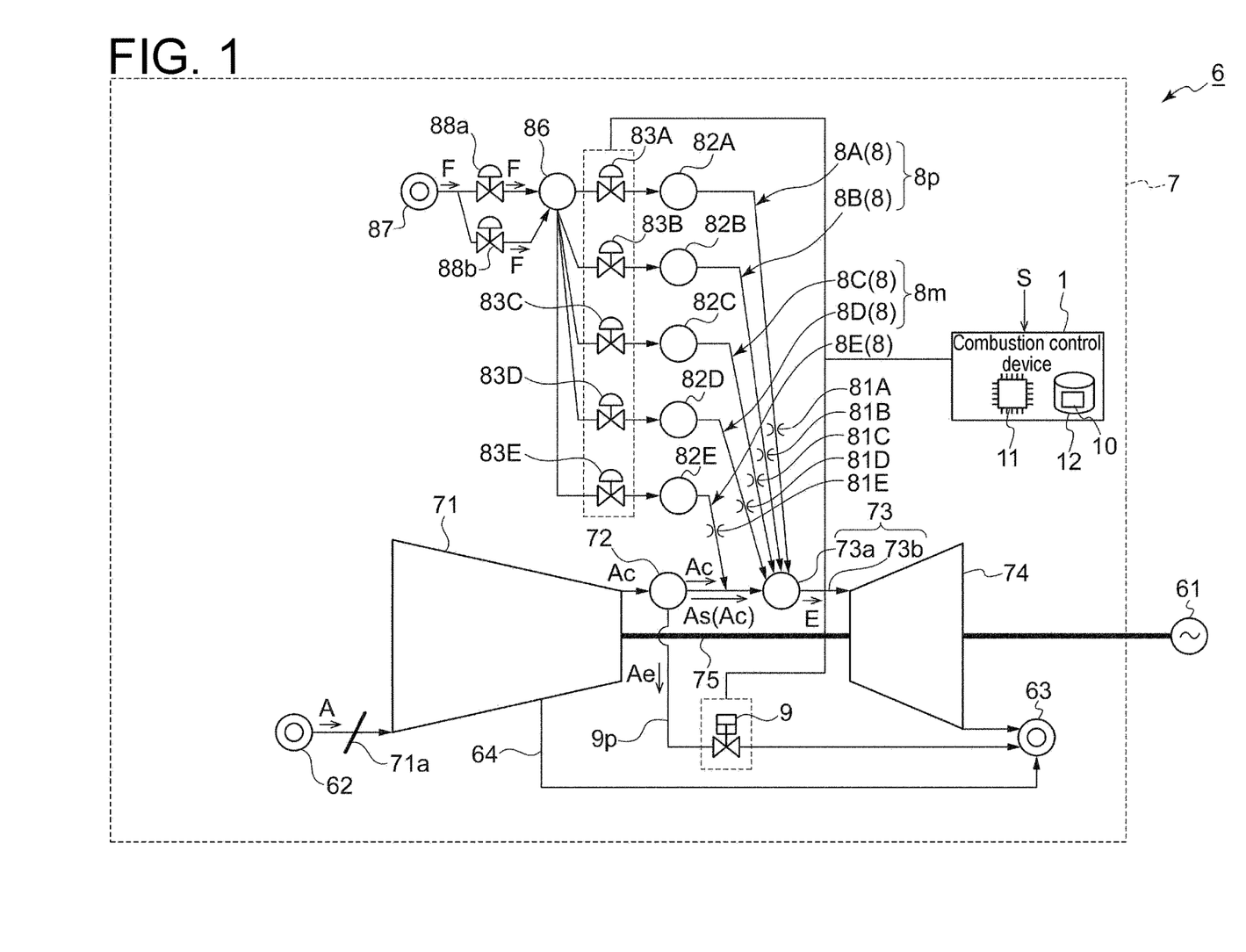
FIG. 1 is a system diagram of a gas turbine plant according to an embodiment of the present invention.

FIG. 1 is a system diagram of a gas turbine plant 6 according to an embodiment of the present invention. As shown in FIG. 1, the gas turbine plant 6 of the present embodiment includes a gas turbine 7 and a generator 61 driven by the gas turbine 7 to generate power. The gas turbine 7 and the generator 61 are coupled by a rotor 75, and the generator 61 is driven by the gas turbine 7 via the rotor 75, thereby generating power. In the embodiment shown in FIG. 1, the generator 61 is coupled to the rotor 75 (to be described later) on a side of a turbine 74 (to be described later). However, in some other embodiments, the generator 61 may be coupled to the rotor 75 (to be described later) on a side of a compressor 71 (to be described later).

(Description of Gas Turbine)

Describing about the gas turbine 7, as shown in FIG. 1, the gas turbine 7 includes the compressor 71 for compressing air A flowing in from an air inlet system 62 to generate compressed air Ac, a casing 72 into which the air compressed by the compressor 71 (compressed air Ac) flows, at least one (plural in FIG. 1) fuel system 8, a combustor 73 for combusting fuel F (fuel gas; the same applies hereafter) supplied from the fuel system 8 by mixing the fuel F and the compressed air Ac flowing in from the casing 72 described above to generate a high-temperature combustion gas E, the turbine 74 for rotating the rotor 75 by the combustion gas E to drive the generator 61, a bleed pipe 9p for bleeding the compressed air Ac from the casing 72 described above, a bleed valve 9 disposed on the bleed pipe 9p, for regulating a bleed air flow of the compressed air Ac bled from the casing 72, and a combustion control device 1 for the gas turbine to be described later.

In the embodiment shown in FIG. 1, the gas turbine 7 includes an IGV (inlet guide vane) 71a for regulating the flow rate of the air A flowing in from the air inlet system 62, and the air having passed through the inlet guide vane 71a flows into the compressor 71.

The gas turbine 7 further includes a plurality of fuel systems 8. That is, the gas turbine 7 includes five fuel systems 8 in total, namely, a diffusion pilot system 8A for stabilizing flame by performing diffusion combustion, a premix pilot system 8B for improving a reduction in NOx of the combustor 73 by performing premix combustion, a main A system 8C and a main B system 8D which are major fuel systems 8 for supplying premixed fuel (premixed gas) according to an output of the gas turbine 7, and a top hat system 8E for injecting the fuel F from upstream of the combustor 73 (a side of the casing 72) in order to improve combustion efficiency and stabilize flame.

More specifically, the diffusion pilot system 8A includes a fuel regulating valve 83A for regulating a fuel flow rate from a fuel tank 86, and a fuel nozzle 81A connected to a diffusion pilot manifold 82A. The premix pilot system 8B includes a fuel regulating valve 83B for regulating the fuel flow rate from the fuel tank 86, and a fuel nozzle 81B connected to a premix pilot manifold 82B. The main A system 8C includes a fuel regulating valve 83C for regulating the fuel flow rate from the fuel tank 86, and a fuel nozzle 81C (main nozzle) connected to a main A manifold 82C. The main B system 8D includes a fuel regulating valve 83D for regulating the fuel flow rate from the fuel tank 86, and a fuel nozzle 81D (main nozzle) connected to a main B manifold 82D. The top hat system 8E includes a fuel regulating valve 83E for regulating the fuel flow rate from the fuel tank 86, and a fuel nozzle 81E connected to a top hat manifold 82E.

Further, the respective fuel systems 8 are connected to the fuel tank 86. The fuel tank 86 is connected to a pressure system 87 for applying a fuel supply pressure to the fuel tank 86, and the fuel supply pressure is applied from the pressure system 87 to the fuel tank 86 via two fuel pressure regulating valves 88 (88a, 88b) for controlling the fuel supply pressure supplied from the pressure system 87 to the fuel tank 86. Thus, the fuel of the fuel tank 86 can be supplied to the combustor 73 via the respective fuel systems 8.

The combustor 73 includes a first cylindrical portion 73a (such as a combustion liner) for generating the combustion gas E by combusting the fuel and the compressed air Ac, and a second cylindrical portion 73b (such as a transition piece) located downstream of the first cylindrical portion 73a and connecting the first cylindrical portion 73a and the turbine 74. Then, the above-described fuel nozzles 81 (81A to 81E) inject the fuel to the first cylindrical portion 73a of the combustor 73. Meanwhile, the fuel nozzle 81E of the top hat system 8E injects the fuel more upstream of the combustor 73.

At least one of the diffusion pilot system 8A and the premix pilot system 8B is often used, such as only the premix pilot system 8B is used. Further, the following description includes all the main systems used for fuel supply to the combustor 73, such as the main A system 8C and the main B system 8D, when referred to as a main fuel system 8m, and includes all the pilot systems used for fuel supply to the combustor 73, such as at least one of the diffusion pilot system 8A and the premix pilot system 8B, when referred to as a pilot fuel system 8p.

Further, in the embodiment shown in FIG. 1, a downstream end of the above-described bleed pipe 9p is connected to an exhaust system 63 for exhausting the combustion gas E from the turbine 74, and the compressed air Ac bled from the casing 72 flows into the exhaust system 63. The flow rate of the compressed air Ac flowing through the bleed pipe 9p is regulated by the bleed valve 9. The bleed valve 9 is fully closed in a load operation of the gas turbine 7, but is opened in load rejection.

However, the present invention is not limited to the present embodiment. It is only necessary that the bleed pipe 9p is disposed to be able to bleed a part of the compressed air Ac from the casing 72, so that the part of the compressed air Ac in the casing 72 is not used as combustion air As in the combustor 73. Thus, in some other embodiments, the compressed air Ac bled from the casing 72 may be flowed to the second cylindrical portion 73b of the combustor 73 by connecting one end of the bleed pipe 9p to the casing 72 and connecting the other end (downstream end) of the bleed pipe 9p to, for example, the second cylindrical portion 73b. Thus, since the downstream end of the bleed pipe 9p is connected downstream of the first cylindrical portion 73a of the combustor 73, it is possible to flow the part of the compressed air Ac, which flows into the first cylindrical portion 73a from the casing 72 inherently (when the bleed valve 9 is fully closed), to bypass the first cylindrical portion 73a, and it is possible to prevent the bled compressed air Ac from being used as the combustion air As in the combustor 73. A cooling pipe 64 is a pipe for bleeding cooling air for cooling the compressor 71.

Further, the combustion control device 1 for the gas turbine 7 (to simply be referred to as the combustion control device 1, hereinafter) is a device for controlling combustion of the gas turbine 7 described above, and at the time of a normal operation (in the normal operation) other than in load rejection of the gas turbine 7, controls a fuel flow rate Gf (fuel supply flow rate) supplied to the combustor 73 and a flow rate of the combustion air As (the compressed air Ac; the same applies hereafter) (air supply flow rate Ga) supplied to the combustor 73 as well, in accordance with the output and operating condition of the gas turbine 7. On the other hand, in load rejection where load rejection of cutting off a load from the gas turbine 7 is performed, the combustion control device 1 controls the fuel regulating valves 83 and the bleed valve 9 while checking a temperature of flame (to be referred to as a flame temperature Tf, hereinafter) in the first cylindrical portion 73a caused by combustion of the fuel F injected from the fuel nozzles 81 (81A to 81E), with the rotation speed of the gas turbine 7 being not greater than a rotation speed threshold, such as the rotation speed being set not greater than 110% of the OST prescribed value, and without causing damage due to flame off and flame.

(Description of Combustion Control Device 1 for Gas Turbine 7)

Figure 2:
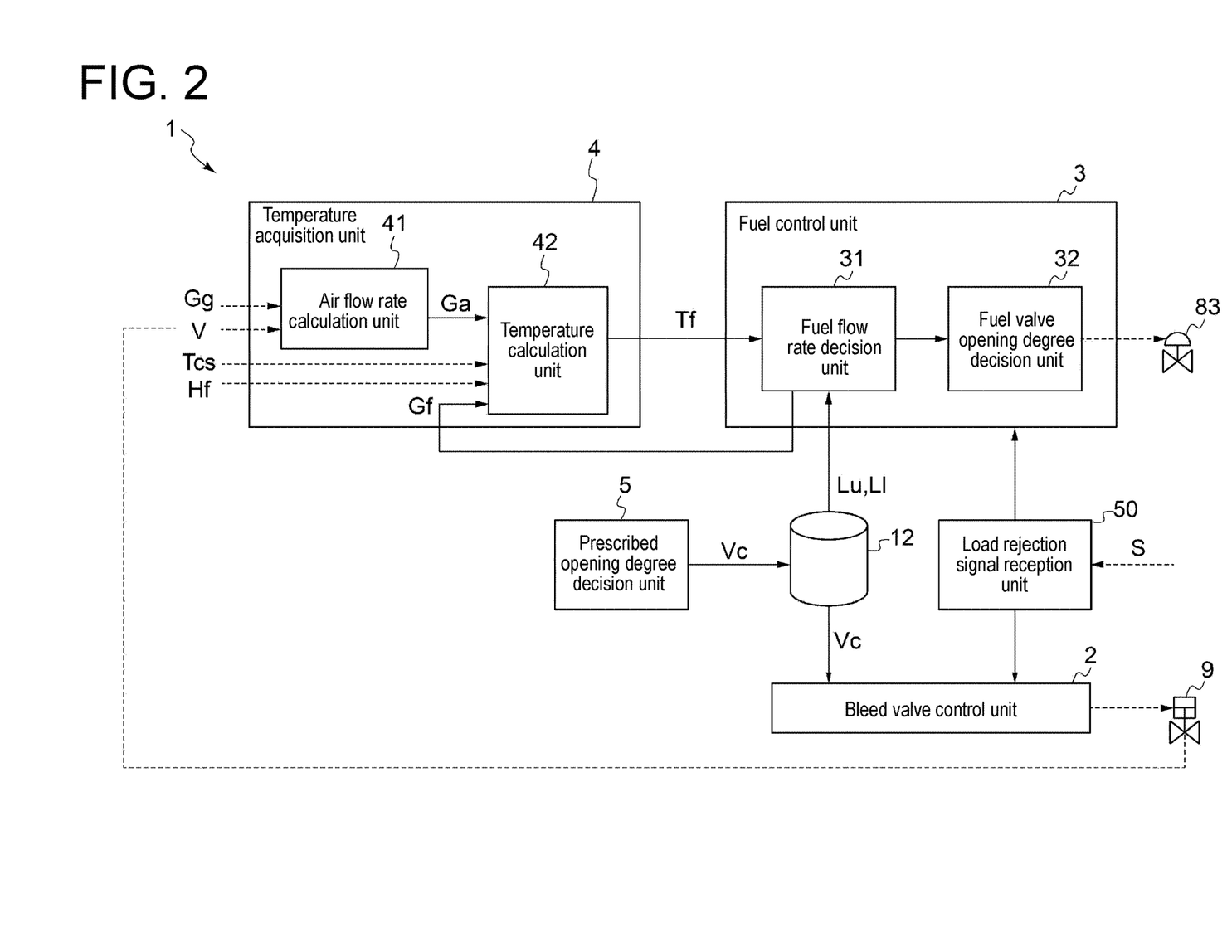
FIG. 2 is a functional block diagram of a combustion control device according to an embodiment of the present invention.
Figure 3A:
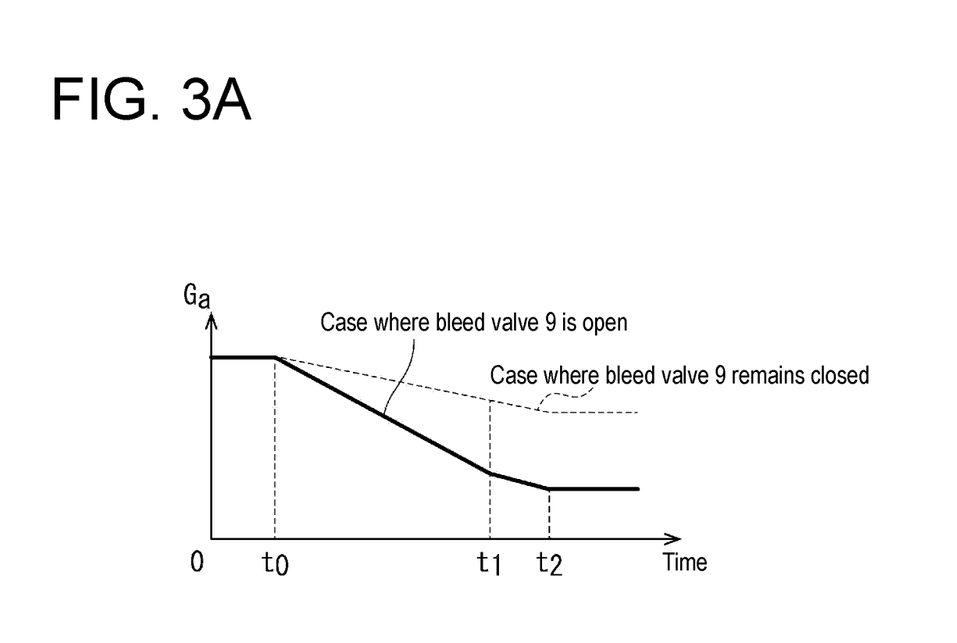
FIG. 3A is a graph showing a transition of an air supply flow rate to a first cylindrical portion of a combustor in load rejection according to an embodiment of the present invention.
Figure 3B:
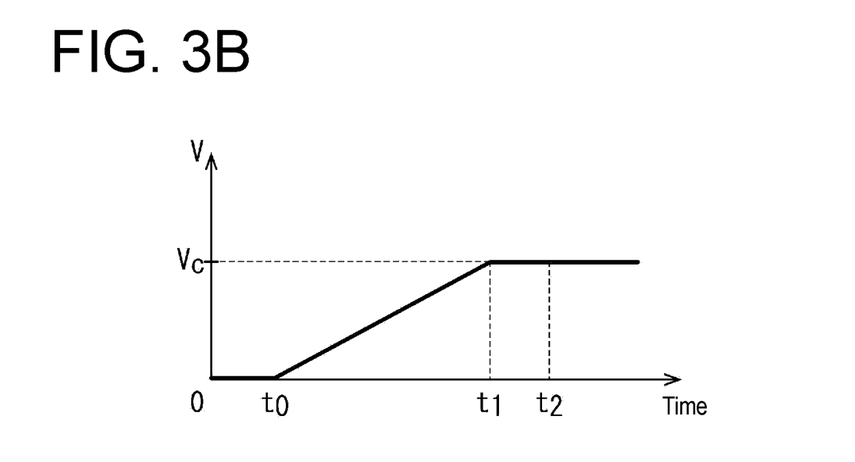
FIG. 3B is a graph showing a transition of a valve opening degree of a bleed valve in load rejection according to an embodiment of the present invention.
Figure 3C:
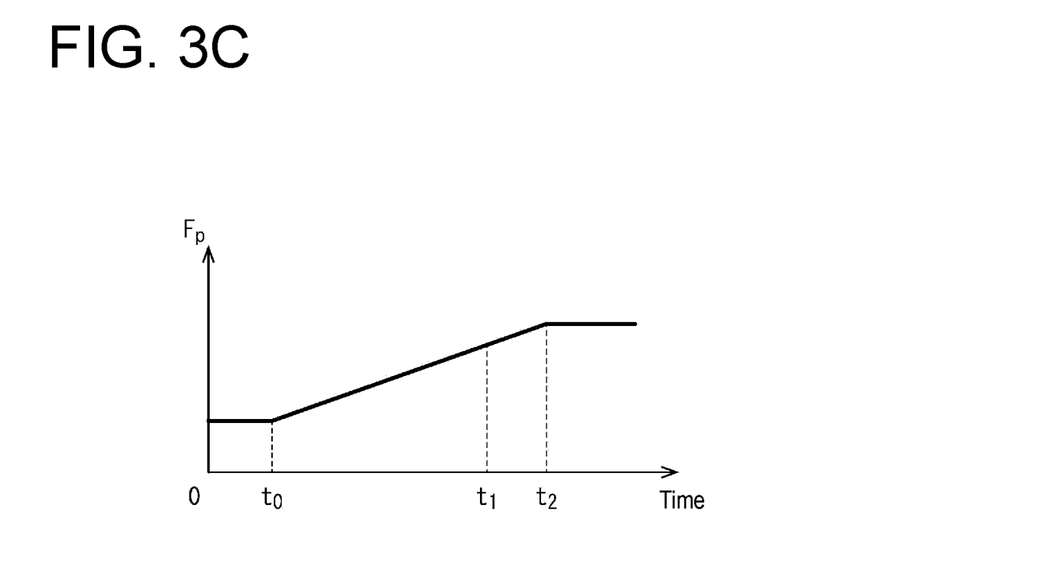
FIG. 3C is a graph showing a transition of a fuel supply flow rate from a pilot fuel system in load rejection according to an embodiment of the present invention.
Figure 3D:
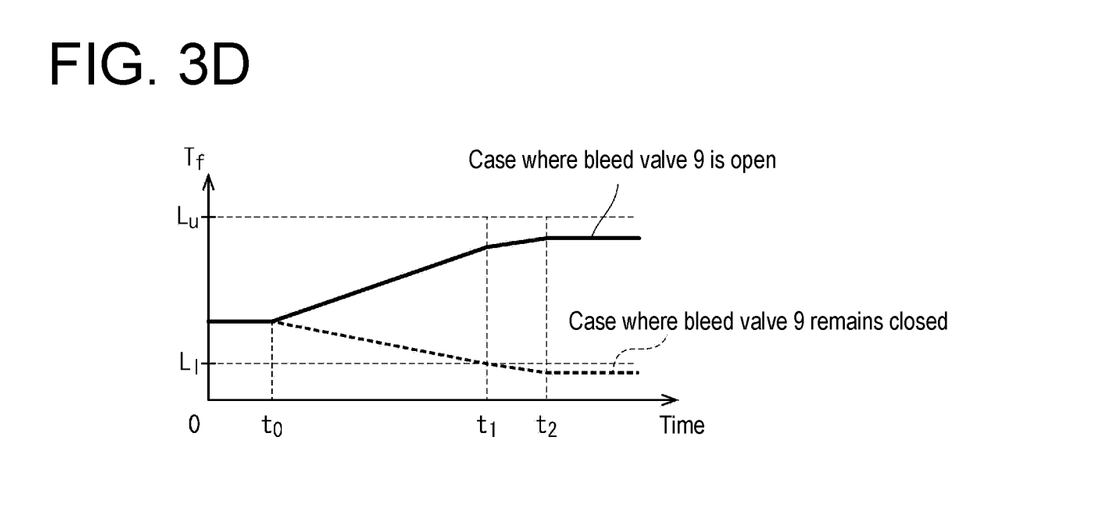
FIG. 3D is a graph showing a transition of a flame temperature in load rejection according to an embodiment of the present invention.

Hereinafter, combustion control performed by the combustion control device 1 for the gas turbine 7 in load rejection will be described in detail with reference to FIGS. 2 to 3D. FIG. 2 is a functional block diagram of the combustion control device 1 according to an embodiment of the present invention. FIG. 3A is a graph showing a transition of the air supply flow rate Ga to the first cylindrical portion 73a of the combustor 73 in load rejection according to an embodiment of the present invention. FIG. 3B is a graph showing a transition of a valve opening degree V of the bleed valve 9 in load rejection according to an embodiment of the present invention. FIG. 3C is a graph showing a transition of the fuel supply flow rate from the pilot fuel system 8p in load rejection according to an embodiment of the present invention. FIG. 3D is a graph showing a transition of the flame temperature Tf in load rejection according to an embodiment of the present invention.

The combustion control device 1 is a device for performing combustion control for the gas turbine 7 for supplying, to the combustor 73, the compressed air Ac by the compressor 71 flowing into the casing 72 described above. As shown in FIG. 2, the combustion control device 1 includes a fuel control unit 3, a bleed valve control unit 2, and a temperature acquisition unit 4. The above-described functional units will be described by taking, as an example, a case where the gas turbine 7 performs load rejection from performing combustion control in the main fuel system 8m including the main A system 8C and the main B system 8D described above, and in the pilot fuel system 8p which is the premix pilot system 8B.

The combustion control device 1 may be constituted by a computer. The computer includes, for example, a processor 11 such as CPU (not shown), a memory (storage device 12) such as ROM and RAM. Then, the processor 11 performs an operation (such as computation of data) in accordance with an instruction of a program (combustion control program 10) loaded to a main storage device, thereby implementing each of the above-described functional units. In other words, the above-described combustion control program 10 is software for causing the computer to implement the above-described respective functional units, not a temporary signal, and may be stored in the above-described storage medium which is computer-readable and portable.

The bleed valve control unit 2 is the functional unit configured to control the valve opening degree V of the bleed valve 9 disposed on the bleed pipe 9p described above. The bleed valve control unit 2 sets the bleed valve 9 in the closed state in the normal operation other than in load rejection, so that the compressed air Ac of the casing 72 is not bled through the bleed pipe 9p.

The fuel control unit 3 is the functional unit configured to control the each fuel regulating valve 83 described above. Controlling the fuel regulating valve 83 (the valve opening degree of the fuel regulating valve 83), the fuel flow rate (fuel amount) supplied into the combustor 73 (into the first cylindrical portion 73a) is controlled. In load rejection, the fuel control unit 3 controls the fuel regulating valves 83 (83C and 83D in FIG. 1) of the main fuel system 8m, and the fuel regulating valve 83 (at least one of 83A or 83B in FIG. 1) of the pilot fuel system 8p, as will be described later.

The temperature acquisition unit 4 is the functional unit configured to acquire the flame temperature Tf of flame caused by combustion of the fuel F in the combustor 73. In some embodiments, the temperature acquisition unit 4 may estimate the flame temperature Tf based on various references indicating the operating conditions of the gas turbine 7. In some other embodiments, the temperature acquisition unit 4 may acquire a measurement value measured by a temperature measurement unit (such as a temperature sensor or the like) capable of directly or indirectly measuring the flame temperature Tf. Although the details will be described later, in the embodiments shown in FIGS. 1 to 3D, the temperature acquisition unit 4 acquires the flame temperature Tf by calculating an estimate value of the flame temperature Tf.

Then, in the combustion control device 1 having the above-described configuration, upon receiving a load rejection signal S for cutting off the load from the gas turbine 7, in load rejection, the fuel control unit 3 increases the supply flow rate of the fuel F from the pilot fuel system 8p (to be referred to as a pilot fuel flow rate Fp, hereinafter) while decreasing the supply amount of the fuel F from the main fuel system 8m in decreasing the total supply amount (total amount) of the fuel F to the combustor 73. That is, while decreasing the valve opening degree of the fuel pressure regulating valve 88 at which the fuel is supplied to the fuel tank 86, the valve opening degree of the fuel regulating valve 83 (83C, 84D) of the main fuel system 8m is decreased, and the valve opening degree of the fuel regulating valve 83 in the pilot fuel system 8p (the fuel regulating valve 83B in the premix pilot system 8B in the present embodiment) is increased.

Then, the fuel control unit 3 and the bleed valve control unit 2, respectively, control the valves to be controlled as follows. That is, the bleed valve control unit 2 controls the valve opening degree V of the bleed valve 9, which is fully closed before the load rejection signal S is received, from the fully closed state to the open state with a prescribed opening degree Vc (see FIG. 3B to be described later). The prescribed opening degree Vc may be full opening as will be described later, or may be an intermediate opening degree where the valve opening degree is low relative to full opening and the valve opening degree is high relative to full closing which is a completely closed state. Further, after the bleed valve 9 is set at the prescribed opening degree Vc in the control in load rejection, the valve opening degree V of the bleed valve 9 may or may not be changed from the prescribed opening degree Vc.

The flame temperature Tf rises as the air-fuel ratio is high, decreasing the possibility of flame off. Thus, if the bleed valve 9 is changed from the closed state to the open state in load rejection, a part of the compressed air Ac flows from the casing 72 so as to bypass the first cylindrical portion 73a of the combustor 73. Consequently, the amount of the combustion air As supplied from the casing 72 to the combustor 73 is relatively decreased (see FIG. 3A to be described later), and the air-fuel ratio in the first cylindrical portion 73a increases, raising the flame temperature Tf (see FIG. 3D to be described later). That is, setting the bleed valve 9 in the open state in load rejection, it is possible to raise the flame temperature Tf without increasing the fuel flow rate. However, if the flame temperature Tf is raised too much by the increase in air-fuel ratio, the gas turbine 7, such as the first cylindrical portion 73a of the combustor 73, may be damaged due to flame.

Thus, the above-described fuel control unit 3 controls the fuel regulating valve 83 such that the flame temperature Tf acquired by the temperature acquisition unit 4 described above falls within a predetermined temperature range defined by an upper limit value Lu and a lower limit value Ll (see FIG. 3C to be described later). The above-described upper limit value Lu is set at a temperature at which damage to the gas turbine 7 due to flame is preventable, and the above-described lower limit value Ll is set at a temperature at which disappearance of flame (flame off) in the combustor 73 is preventable. Thus, the damage to the gas turbine 7 due to flame off in load rejection and flame having the excessively high flame temperature Tf is to be prevented.

In the embodiments shown in FIGS. 1 to 3D, the above-described combustion control device 1 further includes a load rejection signal reception unit 50 configured to receive the load rejection signal S during the operation of the gas turbine 7. Then, with reception of the load rejection signal S by the load rejection signal reception unit 50, the IGV 71a is controlled to be closed, the flow rate of the air A flowing into the compressor 71 is decreased, and the overall flow rate of the compressed air Ac flowing into the casing 72 is decreased. More specifically, in the embodiments shown in FIGS. 3A to 3D, upon receiving the load rejection signal S, the combustion control device 1 starts control in load rejection from time t0, and decreases the overall flow rate of the compressed air Ac by a certain proportion as shown in FIG. 3A.

Thus, as indicated by a dashed line of FIG. 3A, although the flow rate of the combustion air As flowing into the first cylindrical portion 73a of the combustor 73 decreases, at the same time, as shown in FIG. 3B, the bleed valve control unit 2 increases the valve opening degree V of the bleed valve 9 toward the above-described prescribed opening degree Vc over time (in FIG. 3B, increases the valve opening degree by a certain proportion). Thus, the flow rate of the combustion air As flowing into the first cylindrical portion 73a of the combustor 73 is rapidly decreased as indicated by a solid line of FIG. 3A relative to the case of the dashed line, due to the decrease in overall flow rate of the compressed air Ac and the decrease caused by setting the bleed valve 9 in the open state. In FIG. 3A, inflow of the air A to the compressor 71 is still decreased after the valve opening degree V of the bleed valve 9 reaches the prescribed opening degree Vc at time t1, the decrease proportion (inclination of the graph) of the air flow rate indicated by the solid line between the time t1 and time t2 is identical to that by the dashed line.

Meanwhile, regarding the fuel amount supplied into the first cylindrical portion 73a of the combustor 73, the rotation speed of the gas turbine 7 increases as the supplied fuel amount (fuel flow rate) is large. Thus, with reception of the load rejection signal S by the load rejection signal reception unit 50, the fuel control unit 3 increases the pilot fuel flow rate Fp over time as shown in FIG. 3C (increases by a certain proportion in FIG. 3C) in order to prevent flame off, while decreasing the fuel flow rate from the main fuel system 8m to the first cylindrical portion 73a over time as described above. As a result, as indicated by a solid line of FIG. 3D, in the pilot fuel system 8p, with the increase in fuel flow rate and the decrease in the combustion air As by opening control of the bleed valve 9, the flame temperature Tf rises over time, as indicated by the solid line of FIG. 3D.

More specifically, in FIG. 3D, until the time t1, the flame temperature Tf rises due to the above-described two factors. Since the valve opening degree V of the bleed valve 9 becomes the prescribed opening degree Vc at the time t1 (see FIG. 3B), between the time t1 and the time t2 thereafter, the flame temperature Tf rises by the contribution of only the increase in the pilot fuel flow rate Fp described above. Thus, the increase proportion (inclination of the graph) of the flame temperature Tf after the time t1 is moderate.

With such combustion control, the flame temperature Tf becomes greater than the lower limit value Ll, avoiding flame off. Further, the fuel control unit 3 performs feedback control on the fuel supply flow rate while monitoring the flame temperature Tf so that the flame temperature Tf does not exceed the upper limit value Lu, and thus the flame temperature Tf is not greater than the upper limit value Lu. A dashed line of FIG. 3D indicates a case where the bleed valve 9 remains closed, and indicates a case where the air-fuel ratio is low relative to the case where the bleed valve 9 is opened and the flame temperature Tf goes below the lower limit value Ll.

In the embodiments shown in FIGS. 1 to 3D, as shown in FIG. 2, the fuel control unit 3 includes a fuel flow rate decision unit 31 for deciding the fuel flow rate Gf supplied to the combustor 73 such that the flame temperature Tf input from the temperature acquisition unit 4 becomes a set temperature having any value between the above-described upper limit value Lu and the above-described lower limit value Ll (Ll≤set temperature≤Lu), and a fuel valve opening degree decision unit 32 for controlling the fuel regulating valves 83 such that the fuel flow rate Gf decided by the fuel flow rate decision unit 31 is supplied. Then, the valve opening degree V of the bleed valve 9 is fed back and input to the temperature acquisition unit 4, and the fuel regulating valves 83 (the fuel regulating valves 83 of the main fuel system 8m and the pilot fuel system 8p) are controlled while checking the flame temperature Tf that changes in accordance with the valve opening degree V of the bleed valve 9 or the like.

In the embodiments shown in FIGS. 1 to 3D, as shown in FIG. 2, the combustion control device 1 includes a prescribed opening degree decision unit 5 for deciding the prescribed opening degree Vc of the bleed valve 9 described above, and the decided prescribed opening degree Vc is stored in the storage device 12. Then, the bleed valve control unit 2 acquires the prescribed opening degree Vc from the storage device 12. The prescribed opening degree decision unit 5 may store a value input from an operator in the storage device 12, or may decide a value in accordance with a predetermined logic as will be described later, and then may store the value in the storage device 12. Further, the storage device 12 also stores the upper limit value Lu and the lower limit value Ll of the above-described flame temperature Tf, and the above-described fuel control unit 3 acquires such information from the storage device 12.

With the above configuration, the gas turbine 7 includes the bleed pipe and the bleed valve 9 capable of decreasing the supply amount of the combustion air As to the combustor 73 by bleeding the compressed air Ac by the compressor 71 from the casing 72. In such load rejection of the gas turbine 7, when the excessive increase in rotation speed of the gas turbine 7 and flame off in the combustor 73 are prevented, the valve opening degree of each of the bleed valve 9 and the fuel regulating valves is further controlled to control the fuel flow rate and the amount of the combustion air As supplied to the combustor 73, such that the flame temperature Tf in the combustor 73 falls within the predetermined temperature range defined by the upper limit value Lu and the lower limit value Ll. Thus, it is possible to prevent damage to equipment due to the excessive rise in the flame temperature Tf, while preventing the excessive increase in rotation speed of the gas turbine 7 and flame off Next, an embodiment where the flame temperature Tf is estimated will be described.

In some embodiments, as shown in FIG. 2, the temperature acquisition unit 4 may include an air flow rate calculation unit 41 configured to calculate, based on the valve opening degree V of the bleed valve 9, the flow rate of the combustion air As (the above-described air supply flow rate Ga) supplied into the first cylindrical portion 73a, and a temperature calculation unit 42 configured to calculate an estimate value of the flame temperature Tf based on the air supply flow rate Ga and the fuel flow rate Gf of the fuel each being supplied into the first cylindrical portion 73a. That is, the temperature calculation unit 42 calculates the estimate value of the flame temperature Tf in consideration of the valve opening degree V of the bleed valve 9.

At this time, the air flow rate calculation unit 41 may theoretically or experimentally obtain, in advance, a relationship among respective pressures upstream and downstream of the bleed valve 9 in the bleed pipe 9p or a pressure difference between the respective pressures when the bleed valve 9 is fully closed, the valve opening degree V of the bleed valve 9, and the amount of the bled compressed air Ac (to be referred to as a bleed flow rate Ge, hereinafter), for example, and based on a function defining the relationship, may calculate the air supply flow rate Ga when the bleed valve 9 is open at the optional valve opening degree V. That is, the bleed flow rate Ge is obtained through arithmetic calculation of the function by assigning the two upstream and downstream pressures or the pressure difference therebetween and the valve opening degree V of the bleed valve 9 described above to the above-described function. Further, the flow rate of the combustion air As supplied from the casing 72 to the first cylindrical portion 73a when the bleed valve 9 is fully closed (to be referred to as a normal air flow rate Gg, hereinafter) is calculated based on, for example, the valve opening degree of the IGV 71a, the atmospheric pressure, the atmospheric temperature, or the like. The normal air flow rate Gg may be calculated by using a differential pressure type flow rate measurement method. Then, the air supply flow rate Ga when the bleed valve 9 is open at the optional valve opening degree V may be calculated by deducting the bleed flow rate Ge from the calculation result of the normal air flow rate Gg (Ga=Gg−Ge).

Meanwhile, in calculating the estimate value of the flame temperature Tf, the temperature calculation unit 42 may further consider a temperature of the compressed air Ac in the casing 72 (casing air temperature $T_{cs}$) obtained by, for example, measurement by a temperature sensor (not shown), in addition to the air supply flow rate Ga and the fuel flow rate Gf of the fuel F supplied into the first cylindrical portion 73a. Furthermore, the temperature calculation unit 42 may consider a lower heating value Hf of the fuel. That is, the flame temperature Tf may be calculated by any one of Tf=f(Gf, Ga), Tf=(Gf, Ga, $T_{cs}$), or Tf=(Gf, Ga, $T_{cs}$, Hf), where f is an estimate function for estimating the flame temperature Tf, and estimate accuracy improves as elements to be considered increase.

In the embodiment shown in FIG. 2, the estimate value of the flame temperature Tf is calculated based on the air supply flow rate Ga and the fuel flow rate Gf supplied into the first cylindrical portion 73a, the casing air temperature $T_{cs}$, and the lower heating value Hf. More specifically, the air flow rate calculation unit 41 receives the normal air flow rate Gg and the valve opening degree V of the bleed valve 9, and outputs the air supply flow rate Ga. Further, the temperature calculation unit 42 receives the fuel flow rate Gf, the air supply flow rate Ga, the casing air temperature $T_{cs}$ in the casing 72, and the lower heating value Hf of the fuel calculated in the fuel control unit 3, and outputs the estimate value of the flame temperature Tf calculated based on the above. Thus, calculating the air supply flow rate Ga in consideration of the valve opening degree V of the bleed valve 9, it is possible to obtain the air supply flow rate Ga more accurately, and to accurately estimate the flame temperature Tf without actually measuring the same.

The above-described lower heating value Hf may be measured in real time by installing a calorie meter (not shown) on the fuel tank 86 or upstream thereof, and in the embodiment shown in FIG. 2, a measurement result of the lower heating value Hf by the calorie meter is input to the temperature calculation unit 42.

With the above configuration, the temperature acquisition unit calculates the flow rate of the combustion air As (compressed air Ac) supplied to the inside (combustion space) of the first cylindrical portion 73a of the combustor 73 in consideration of the valve opening degree V of the bleed valve 9, and estimates the flame temperature Tf based on the calculated flow rate of the combustion air As and the fuel flow rate. Thus considering the valve opening degree of the bleed valve, it is possible to obtain the flow rate of the combustion air As more accurately, and to accurately estimate the flame temperature Tf without actually measuring the same.

Figure 4A:
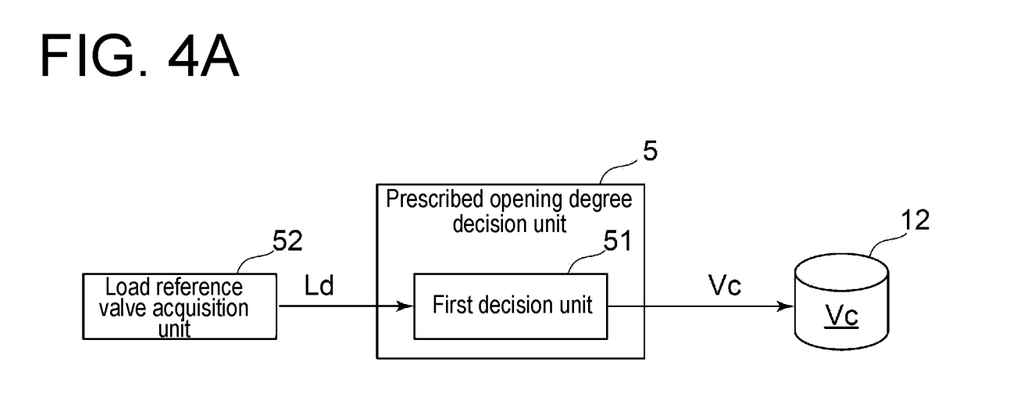
FIG. 4A is a functional block diagram of a bleed valve control unit according to an embodiment of the present invention, where the bleed valve is controlled based on a load of the gas turbine.
Figure 4B:
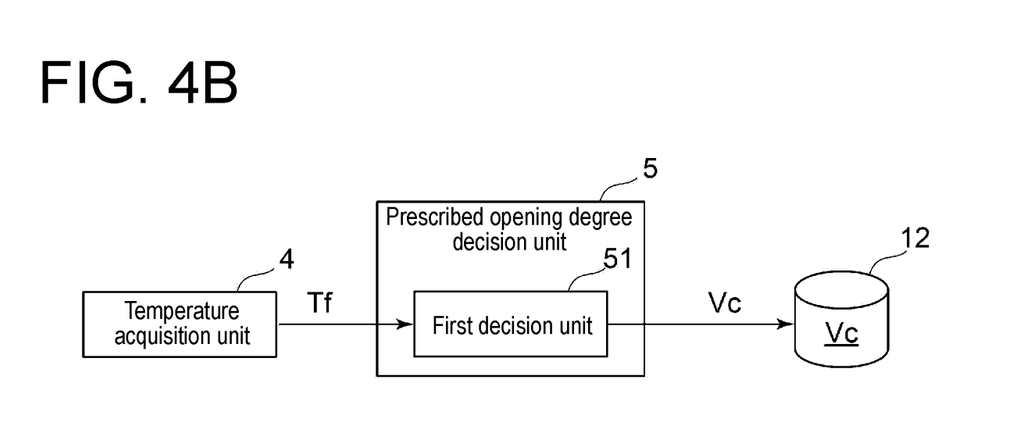
FIG. 4B is a functional block diagram of the bleed valve control unit according to an embodiment of the present invention, where the bleed valve is controlled based on the flame temperature.
Figure 5:
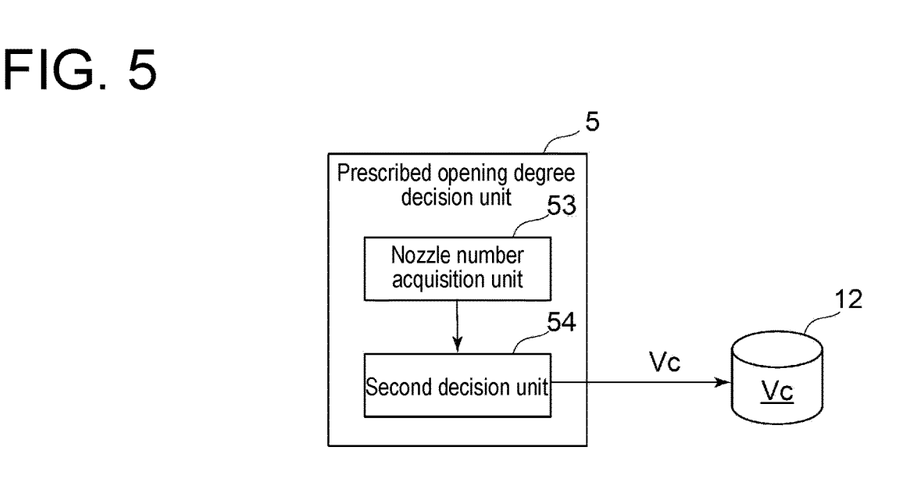
FIG. 5 is a functional block diagram of the bleed valve control unit according to an embodiment of the present invention, where the bleed valve is controlled based on the number of used main nozzles in load rejection.

Next, a method for deciding the above-described prescribed opening degree Vc set for the bleed valve 9 by the bleed valve control unit 2 in load rejection will be described with reference to FIGS. 4A to 5. FIG. 4A is a functional block diagram of the bleed valve control unit 2 according to an embodiment of the present invention, where the bleed valve 9 is controlled based on the load of the gas turbine 7. FIG. 4B is a functional block diagram of the bleed valve control unit 2 according to an embodiment of the present invention, where the bleed valve 9 is controlled based on the flame temperature Tf. FIG. 5 is a functional block diagram of the bleed valve control unit 2 according to an embodiment of the present invention, where the bleed valve 9 is controlled based on the number of used main nozzles in load rejection.

In some embodiments, the above-described prescribed opening degree Vc may be full opening. The valve is in a region where a change in flow rate is extremely small and the flow rate is rarely changed, even if the valve is opened by not less than a certain valve opening degree. Thus, the above-described full opening may include not only a valve opening degree in a case where the valve is opened 100%, but also a valve opening degree which is less than 100% and obtains the same result as the case where the valve is opened 100%. Thereby, it is possible to maximize the increase in air-fuel ratio by the bleed valve 9. Thus, it is possible to minimize the fuel amount supplied to prevent flame off, and to improve fuel efficiency.

The flame temperature Tf is associated with the load (output; the same applies hereafter) of the gas turbine 7, and in general, the flame temperature Tf is also low when the load of the gas turbine 7 is low and on the contrary, the flame temperature Tf is also high when the load is high. For example, since the flame temperature Tf is inherently low when the above-described load is low, it is easy to perform control so that the flame temperature Tf does not exceed the upper limit value Lu even if the supply amount of the combustion air As to the combustor 73 is decreased by, for example, fully opening the bleed valve 9. However, since the flame temperature Tf is inherently high when the above-described load is high, it is predicted that the rise of the flame temperature Tf is likely to be excessive if, for example, the bleed valve 9 is fully opened, which may make it difficult to keep the flame temperature Tf within the predetermined range by controlling the fuel regulating valves 83.

Thus, in some embodiments, as shown in FIGS. 4A and 4B, the prescribed opening degree Vc of the bleed valve 9 described above may be decided based on the above-described flame temperature Tf or a load reference value Ld (a load value, an output value, or the like) of the gas turbine 7 upon reception, such as immediately before reception, of the load rejection signal S. As a result, the above-described prescribed opening degree Vc is decided as full opening, the intermediate opening degree, or the like. For example, if the load reference value Ld or the flame temperature Tf are monitored before reception of the load rejection signal S, and then the load rejection signal S is received, the prescribed opening degree Vc may be decided based on the load reference value Ld or the flame temperature Tf immediately before the reception.

In the embodiments shown in FIGS. 4A and 4B, the above-described prescribed opening degree decision unit 5 further includes a first decision unit 51 for deciding the above-described prescribed opening degree Vc of the bleed valve 9 based on the load reference value Ld (FIG. 4A) of the gas turbine 7 or the flame temperature Tf (FIG. 4B) when the load rejection signal S is received. In the embodiment shown in FIG. 4, the combustion control device 1 further includes a load reference value acquisition unit 52 configured to acquire the load reference value Ld of the gas turbine 7 when the load rejection signal S is received. Then, the above-described first decision unit 51 decides the above-described prescribed opening degree Vc of the bleed valve 9 based on the load reference value Ld acquired by the load reference value acquisition unit 52. On the other hand, in the embodiment shown in FIG. 4B, the above-described first decision unit 51 acquires the flame temperature Tf from the above-described temperature acquisition unit 4, and decides the above-described prescribed opening degree Vc of the bleed valve 9 based on the acquired flame temperature Tf. For example, the prescribed opening degree decision unit 5 may acquire a valve opening degree according the load reference value Ld or the flame temperature Tf acquired by using, for example, a function where a correspondence relationship between the optional load reference value Ld or the optional flame temperature Tf and a valve opening degree according thereto is determined in advance, and may have the acquired valve opening degree as the prescribed opening degree Vc.

With the above configuration, the prescribed opening degree Vc of the bleed valve 9 is decided based on the flame temperature Tf or the load reference value Ld of the gas turbine 7 in load rejection. Thus, after the bleed valve 9 is set at the prescribed opening degree Vc, it is possible to more reliably prevent the flame temperature Tf from exceeding the upper limit value Lu by control of the fuel regulating valves 83. Further, in estimating the flame temperature Tf, it is possible to predict, in advance, a case such as where the flame temperature Tf stays high, and in such a case, it is possible to, for example, set the bleed valve 9 at the intermediate opening degree.

Further, in load rejection, in accordance with characteristics of equipment, such as the occurrence status of combustion oscillation, the number of used fuel nozzles 81 in the main fuel system 8m (to be referred to as main nozzles, hereinafter) may be changed (changed from eight to three, for example). If the number of used main nozzles is changed, the fuel flow rate per main nozzle used in the main fuel system 8m is changed, and thus the flame temperature Tf can also be changed. For example, as shown in FIG. 1, five main nozzles are connected to the main A system 8C, and three main nozzles are connected to the main B system 8D. In this case, the number of used main nozzles can be changed, such as the number of used main nozzles becomes three in total by, for example, stopping fuel supply from the main A system 8C after reception of the load rejection signal S and performing fuel supply only from the main B system 8D from the operation where a total of eight main nozzles is used by fuel supply from the main A system 8C and the main B system 8D before reception of the load rejection signal S.

Thus, in some embodiments, as shown in FIG. 5, the bleed valve control unit 2 may acquire the number of main nozzles used after reception of the load rejection signal S, and may decide the above-described prescribed opening degree Vc of the bleed valve 9 based on the acquired number of used main nozzles. For example, in a case where the bleed valve 9 is set at a high opening degree, such as full opening, when the number of used main nozzles is eight, if the fuel is concentrated by each of the used main nozzles by decreasing the number of used main nozzles to five or three, the fuel per main nozzle increases. Thus, promoting further drop in the flame temperature Tf by further decreasing the air-fuel ratio per main nozzle by further decreasing the prescribed opening degree Vc of the bleed valve 9 relative to the case where the number of used main nozzles is larger, the flame temperature Tf may be prevented from exceeding the upper limit value Lu.

In the embodiment shown in FIG. 5, the above-described prescribed opening degree decision unit 5 includes a nozzle number acquisition unit 53 configured to acquire the number of fuel nozzles 81 in the main fuel system 8m used after reception of the load rejection signal S, and a second decision unit 54 configured to decide the above-described prescribed opening degree Vc of the bleed valve 9 based on the above-described number of used fuel nozzles 81 acquired by the nozzle number acquisition unit 53.

With the above configuration, when the fuel F is supplied from the main fuel system 8m to the combustor 73 by using the plurality of fuel nozzles 81 (main nozzles), the prescribed opening degree Vc of the bleed valve 9 is decided based on the number of main nozzles used in load rejection. For example, in the case where the prescribed opening degree Vc of the bleed valve 9 is set at the relatively high opening degree, such as full opening, when the number of used main nozzles is eight, if the fuel F is concentrated by decreasing the number of main nozzles to three, five, the fuel F per main nozzle increases, further decreasing the prescribed opening degree Vc of the bleed valve 9. Thus, it is possible to more reliably prevent the flame temperature Tf from exceeding the upper limit value Lu.

Figure 6:
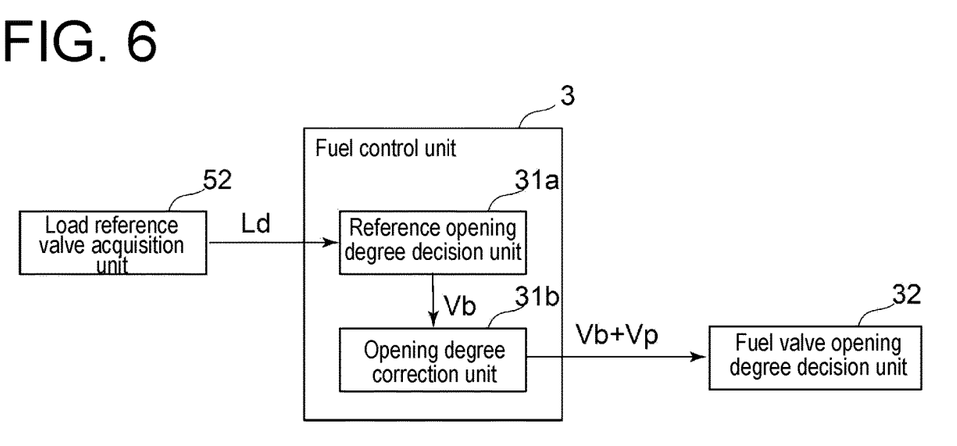
FIG. 6 is a functional block diagram of a fuel control unit according to an embodiment of the present invention.

Next, an embodiments relating to the fuel control unit 3 will be described with reference to FIG. 6. FIG. 6 is a functional block diagram of the fuel control unit 3 according to an embodiment of the present invention.

The embodiment where the prescribed opening degree Vc of the bleed valve 9 is decided based on the load reference value Ld and the like has already been described. In some embodiments, as shown in FIG. 6, the valve opening degree of the fuel regulating valve in the pilot fuel system 8p may also be decided based on the load reference value Ld. As already described, in general, the combustor 73 is connected to the pilot fuel system 8p and the main fuel system 8m. Then, supply of the fuel F to the combustor 73 in load rejection is controlled such that supply from the main fuel system is decreased and supply from the pilot fuel system 8p is increased, in decreasing the supply amount of the fuel F as a whole. Thus, the fuel control unit 3 controls the fuel regulating valve (81A or 81B) of the pilot fuel system 8p based on the load reference value Ld.

In the embodiment shown in FIG. 6, the combustion control device 1 includes the above-described load reference value acquisition unit 52. Then, the fuel control unit 3 includes a reference opening degree decision unit 31a configured to decide a reference opening degree Vb of the fuel regulating valve 83 in the pilot fuel system 8p in accordance with the operating condition of the gas turbine 7, upon reception of the load rejection signal S by the load rejection signal reception unit 50 described above, and an opening degree correction unit 31b configured to add an additional opening degree Vp to the reference opening degree Vb in a low load where the load reference value Ld of the gas turbine 7 is lower than the load reference value Ld in rating such as rated load (rated load reference value). That is, by adding the additional opening degree Vp to the reference opening degree Vb in low load, the fuel flow rate is increased relative to low load to increase the air-fuel ratio, thereby less causing flame off.

With the above configuration, if the operating condition of the gas turbine 7 is in low load in load rejection, the valve opening degree of the fuel regulating valve in the pilot fuel system 8p is further increased relative to that in rated load and high load to further increase the fuel flow rate to be supplied. If the operating condition of the gas turbine 7 is in low load in load rejection, the valve opening degree of the fuel regulating valve 83 described above is low, resulting in relatively low air-fuel ratio and the low flame temperature Tf. Thus, if load rejection is performed in the low load condition, further increasing the fuel flow rate of the fuel regulating valve 83 in the pilot fuel system 8p, it is possible to improve responsiveness to the rise in the flame temperature Tf, and to prevent flame off more reliably, such as to prevent the flame temperature Tf from going below the lower limit value Ll.

Figure 7:
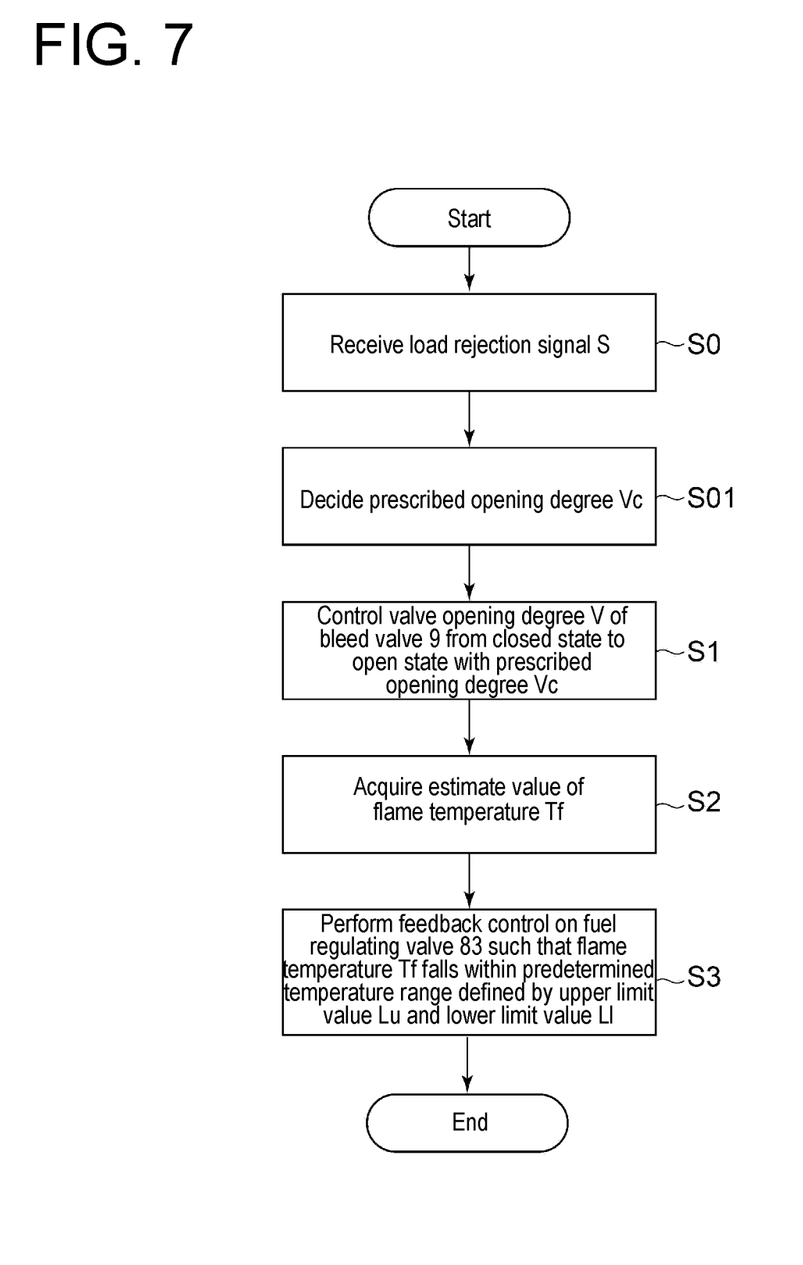
FIG. 7 is a flowchart showing a combustion control method for the gas turbine according to an embodiment of the present invention.

Hereinafter, a combustion control method corresponding to the process performed by the above-described combustion control device 1 will be described with reference to FIG. 7. FIG. 7 is a flowchart showing the combustion control method for the gas turbine 7 according to an embodiment of the present invention.

As shown in FIG. 7, the combustion control method for the gas turbine 7 (will simply be referred to as the combustion control method, hereinafter) includes a bleed valve control step of controlling the valve opening degree V of the bleed valve 9 described above, a fuel control step of controlling the above-described fuel regulating valves 83, and a temperature acquisition step of acquiring the flame temperature Tf of the flame described above. These bleed valve control step (S1) and fuel control step (S2), and temperature acquisition step (S3) are, respectively, the same as processing contents performed by the bleed valve control unit 2, the fuel control unit 3, and the temperature acquisition unit 4 that have already been described, and thus details of which will be omitted.

In the embodiment shown in FIG. 7, step S0 includes receiving the load rejection signal S. Subsequently, step S1 includes performing the bleed valve control step to control the valve opening degree V of the bleed valve 9 from the closed state to the open state with the prescribed opening degree Vc. Step S2 includes performing the temperature acquisition step to calculate the estimate value of the flame temperature Tf. Step S3 includes performing the fuel control step to control the fuel regulating valves 83 by feedback control such that the above-described flame temperature Tf falls within the predetermined temperature range defined by the upper limit value Lu and the lower limit value Ll.

For example, the order of step S2 and step S3 may be reversed. That is, for example, the fuel flow rate may be decided first which is not greater than the fuel flow rate at which the rotation speed of the gas turbine 7 is the rotation speed threshold, the decided fuel flow rate may be supplied to the combustor 73, and then the flame temperature Tf may be acquired to control the fuel flow rate. Alternatively, the flame temperature Tf in the case where the valve opening degree V of the bleed valve 9 is set at the prescribed opening degree Vc may be estimated first, and then the fuel flow rate may be controlled based on the estimated flame temperature Tf.

Further, in some embodiments, the combustion control method may further include a prescribed opening degree decision step of deciding the above-described prescribed opening degree Vc. The prescribed opening degree decision step is the same as the processing contents performed by the prescribed opening degree decision unit 5 that have already been described, and thus details of which will be omitted. As shown in FIG. 7, the prescribed opening degree decision step may be performed between step S0 and step S1 of FIG. 7.

The present invention is not limited to the above-described embodiments, and also includes an embodiment obtained by modifying the above-described embodiments and an embodiment obtained by combining these embodiments as appropriate. For example, the above-described prescribed opening degree Vc may be decided based on the load reference value Ld or the flame temperature Tf and the number of used main nozzles.

(Appendix)

(1) A combustion control device (1) for a gas turbine (7) according to at least one embodiment of the present invention is a combustion control device (1) for a gas turbine (7) for supplying, to a combustor (73), compressed air (Ac) by a compressor (71) flowing into a casing (72), the device including a bleed valve control unit (2) configured to control a bleed valve (9) disposed on a bleed pipe (9p) for performing bleeding so that a part of the compressed air (Ac) flowing into the casing (72) is not used as combustion air (As) in the combustor (73), a fuel control unit (3) configured to control a fuel regulating valve (83) for regulating a fuel flow rate of fuel (F) supplied to the combustor (73), and a temperature acquisition unit (4) configured to acquire a flame temperature (Tf) of flame caused by combustion of the fuel (F) in the combustor (73). Upon reception of a load rejection signal (S) for cutting off a load from the gas turbine (7), the bleed valve control unit (2) controls a valve opening degree of the bleed valve (9) from a closed state to an open state with a prescribed opening degree (Vc), and the fuel control unit (3) controls the fuel regulating valve (83) such that the acquired flame temperature (Tf) falls within a predetermined temperature range defined by an upper limit value (Lu) and a lower limit value (Ll).

With the above configuration (1), the gas turbine (7) includes the bleed pipe (9p) and the bleed valve (9) capable of decreasing the supply amount of the combustion air (As) to the compressor (73) by bleeding the compressed air (Ac) by the compressor (71) from the casing (72). In such load rejection of the gas turbine (7), the combustion control device (1) conventionally performs combustion control so as to prevent the excessive increase (such as the increase exceeding 110% of the OST prescribed value) in rotation speed of the gas turbine (7) and flame off in the combustor (73), and further controls the valve opening degree of each of the bleed valve (9) and the fuel regulating valve (83) to control the fuel flow rate and the flow rate of the combustion air (As) supplied to the combustor (73), such that the flame temperature (Tf) in the combustor (73) falls within the predetermined temperature range defined by the upper limit value (Lu) and the lower limit value (Ll).

The rotation speed of the gas turbine (7) increases as the supplied fuel amount (fuel flow rate) is large, and the flame temperature (Tf) increases as the air-fuel ratio is high. Thus, if the bleed valve (9) is changed from the closed state to the open state in load rejection, a part of the compressed air (Ac) flows from the casing (72) so as to bypass the combustor (73) (a first cylindrical portion (73a) to be described later), decreasing the amount of the combustion air (As) supplied from the casing (72) to the combustor (73) and increasing the air-fuel ratio. That is, setting the bleed valve (9) in the open state in load rejection, it is possible to raise the flame temperature (Tf) without increasing the fuel flow rate. Thus, by setting the upper limit value (Lu) of the flame temperature (Tf) in the combustor (73) at, for example, a temperature at which damage to the gas turbine (7) by flame is preventable, installing the lower limit value (Ll) at a temperature at which flame off of the flame is preventable, and controlling the fuel flow rate and air amount (air flow rate) to be supplied such that the flame temperature (Tf) falls within the temperature range, it is possible to prevent damage to equipment due to the excessive rise of the flame temperature (Tf) while preventing the flame off and the excessive increase in rotation speed of the gas turbine (7).

(2) In some embodiments, in the above configuration (1), the combustor (73) includes a first cylindrical portion (73a) for generating a combustion gas by combusting the fuel and the compressed air (Ac), and the temperature acquisition unit (4) includes an air flow rate calculation unit (41) configured to calculate an air flow rate of the combustion air (As) supplied into the first cylindrical portion (73a), based on the valve opening degree of the bleed valve (9), and a temperature calculation unit (42) configured to calculate an estimate value of the flame temperature (Tf), based on the flow rate of the combustion air (As) and a fuel flow rate of the fuel each of which is supplied into the first cylindrical portion (73a).

With the above configuration (2), the temperature acquisition unit (4) calculates the flow rate of the combustion air (As) (compressed air (Ac)) supplied to the inside (combustion space) of the first cylindrical portion (73a) (such as a combustor liner) of the combustor (73) in consideration of the valve opening degree of the bleed valve (9), and estimates the flame temperature (Tf) based on the calculated flow rate of the combustion air (As) and the fuel flow rate. Thus considering the valve opening degree of the bleed valve (9), it is possible to obtain the flow rate of the combustion air (As) more accurately, and to accurately estimate the flame temperature (Tf) without actually measuring the same.

(3) In some embodiments, in the above configurations (1) and (2), the combustion control device (1) for the gas turbine (7) further includes a prescribed opening degree decision unit (5) for deciding the prescribed opening degree (Vc). The prescribed opening degree decision unit (5) includes a first decision unit (51) for deciding the prescribed opening degree (Vc) of the bleed valve (9) based on the flame temperature (Tf) or a load reference value (Ld) of the gas turbine (7) when the load rejection signal (S) is received.

With the above configuration (3), the prescribed opening degree (Vc) of the bleed valve (9) is decided based on the flame temperature (Tf) or the load reference value (Ld) of the gas turbine (7) in load rejection. The flame temperature (Tf) is associated with the load of the gas turbine (7), and in general, the flame temperature (Tf) is also low when the load (output) of the gas turbine (7) is low and on the contrary, the flame temperature (Tf) is also high when the load is high. For example, since the flame temperature (Tf) is inherently low when the above-described load is low, it is easy to perform control so that the flame temperature (Tf) does not exceed the upper limit value (Lu) even if the supply amount of the combustion air (As) to the combustor (73) is decreased by, for example, fully opening the bleed valve (9). However, since the flame temperature (Tf) is inherently high when the above-described load is high, it is predicted that the rise of the flame temperature (Tf) is likely to be excessive if, for example, the bleed valve (9) is fully opened, which may make it difficult to keep the flame temperature (Tf) within the predetermined range by controlling the fuel regulating valves (83).

Thus, by controlling the valve opening degree of the bleed valve (9) at full opening or an intermediate opening degree which is less than full opening based on the flame temperature (Tf) or the load reference value (Ld) of the gas turbine (7) upon reception (such as immediately before reception) of the load rejection signal (S), it is possible to more reliably prevent the flame temperature (Tf) from exceeding the upper limit value (Lu) by control of the fuel regulating valves (83), after the bleed valve (9) is set at the prescribed opening degree (Vc). Further, in estimating the flame temperature (Tf), it is possible to predict, in advance, a case such as where the flame temperature (Tf) stays high, and in such a case, it is possible to, for example, set the bleed valve (9) at the intermediate opening degree.

(4) In some embodiments, in the above configuration (3), the combustor (73) is connected to a plurality of fuel systems (8) including a pilot fuel system (8p), and the fuel control unit (3) includes a reference opening degree decision unit (31a) configured to decide a reference opening degree (Vb) of the fuel regulating valve (83) in the pilot fuel system (8p) in accordance with an operating condition of the gas turbine (7), upon the reception of the load rejection signal (S), and an opening degree correction unit (31b) configured to add an additional opening degree (Vp) to the reference opening degree (Vb), in a low load where the load reference value (Ld) of the gas turbine (7) when the load rejection signal (S) is received is lower than a rated load reference value.

In general, the combustor (73) is connected to the pilot fuel system (8p) for stabilizing flame, and the major main fuel system (8m) for supplying premixed fuel in accordance with the output of the gas turbine (7). Then, supply of the fuel to the combustor (73) in load rejection is controlled such that supply from the main fuel system (8m) is decreased and supply from the pilot fuel system (8p) is increased, in decreasing the supply amount of the fuel as a whole.

With the above configuration (4), if the operating condition of the gas turbine (7) is in low load in load rejection, the valve opening degree of the fuel regulating valve (83) in the pilot fuel system (8p) is further increased relative to that in rated load and high load to further increase the fuel flow rate to be supplied. If the operating condition of the gas turbine (7) is in low load in load rejection, the valve opening degree of the fuel regulating valve (83) described above is low, resulting in relatively low air-fuel ratio and the low flame temperature (Tf). Thus, if load rejection is performed in the low load condition, further increasing the fuel flow rate of the fuel regulating valve (83) in the pilot fuel system (8p), it is possible to improve responsiveness to the rise in the flame temperature (Tf), and to prevent flame off more reliably, such as to prevent the flame temperature (Tf) from going below the lower limit value (Ll).

(5) In some embodiments, in any one of the above configurations (1) to (4), the combustor (73) is connected to a plurality of fuel systems (8) including a main fuel system (8m) for supplying premixed fuel of the fuel and the combustion air (As) at a flow rate according to a load of the gas turbine (7) to the combustor (73) by using a plurality of fuel nozzles (81), the combustion control device (1) for the gas turbine (7) further comprises a prescribed opening degree decision unit (5) for deciding the prescribed opening degree (Vc), and the prescribed opening degree decision unit (5) includes a nozzle number acquisition unit configured to acquire the number of fuel nozzles (81) in the main fuel system (8m) used after the reception of the load rejection signal (S), and a second decision unit configured to decide the prescribed opening degree (Vc) of the bleed valve (9) based on the number of used fuel nozzles (81).

In load rejection, in accordance with characteristics of equipment, such as the occurrence status of combustion oscillation, the number of used fuel nozzles (81) in the main fuel system (8m) (main nozzles) may be changed (changed from eight to three, for example). If the number of used main nozzles is changed, the fuel flow rate per main nozzle used in the main fuel system (8m) is changed, and thus the flame temperature (Tf) can also be changed.

With the above configuration (5), when the fuel is supplied from the main fuel system (8m) to the combustor (73) by using the plurality of fuel nozzles (81) (main nozzles), the prescribed opening degree (Vc) of the bleed valve (9) is decided based on the number of main nozzles used in load rejection. For example, in the case where the prescribed opening degree (Vc) of the bleed valve (9) is set at the relatively high opening degree, such as full opening, when the number of used main nozzles is eight, if the fuel is concentrated by decreasing the number of main nozzles to three, five, the fuel per main nozzle increases, further decreasing the prescribed opening degree (Vc) of the bleed valve (9). Thus, it is possible to more reliably prevent the flame temperature (Tf) from exceeding the upper limit value (Lu).

(6) In some embodiments, in the above configuration (1) or (2), the prescribed opening degree (Vc) is full opening.

With the above configuration (6), in load rejection, the valve opening degree of the bleed valve (9) is set at full opening. Thereby, it is possible to maximize the increase in air-fuel ratio by the bleed valve (9). Thus, it is possible to minimize the fuel amount supplied to prevent flame off, and to improve fuel efficiency.

(7) In some embodiments, in any one of the above configuration (1) to (6), the upper limit value (Lu) is a temperature at which damage to the gas turbine (7) due to the flame is preventable, and the lower limit value (Ll) is a temperature at which flame off of the flame is preventable.

With the above configuration (7), defining the upper limit value (Lu) and the lower limit value (Ll) of the flame temperature (Tf) as described above, it is possible to prevent flame off and damage to the gas turbine (7) in load rejection.

(8) A combustion control method for a gas turbine (7) according to at least one embodiment of the present invention is a combustion control method for a gas turbine (7) for supplying, to a combustor (73), compressed air (Ac) by a compressor (71) flowing into a casing (72), the method including a bleed valve (9) control step of controlling a bleed valve (9) disposed on a bleed pipe (9p) for performing bleeding so that a part of the compressed air (Ac) flowing into the casing (72) is not used as combustion air (As) in the combustor (73), a fuel control step of controlling a fuel regulating valve (83) for regulating a fuel flow rate of fuel supplied to the combustor (73), and a temperature acquisition step of acquiring a flame temperature (Tf) of flame caused by combustion of the fuel in the combustor (73). Upon reception of a load rejection signal (S) for cutting off a load from the gas turbine (7), the bleed valve (9) control step includes controlling a valve opening degree of the bleed valve (9) from a closed state to an open state with a prescribed opening degree (Vc), and the fuel control step includes controlling the fuel regulating valve (83) such that the acquired flame temperature (Tf) falls within a predetermined temperature range defined by an upper limit value (Lu) and a lower limit value (Ll).

With the above configuration (8), the same effect as the above configuration (1) is achieved.

(9) A combustion control program (10) for a gas turbine (7) according to at least one embodiment of the present invention is a combustion control program (10) for a gas turbine (7) for supplying, to a combustor (73), compressed air (Ac) by a compressor (71) flowing into a casing (72), the program including in a computer a bleed valve control unit (2) configured to control a bleed valve (9) disposed on a bleed pipe (9p) for performing bleeding so that a part of the compressed air (Ac) flowing into the casing (72) is not used as combustion air (As) in the combustor (73), a fuel control unit (3) configured to control a fuel regulating valve (83) for regulating a fuel flow rate of fuel supplied to the combustor (73), and a temperature acquisition unit (4) configured to acquire a flame temperature (Tf) of flame caused by combustion of the fuel in the combustor (73). Upon reception of a load rejection signal (S) for cutting off a load from the gas turbine (7), the program causes the computer to implement such that the bleed valve control unit (2) controls a valve opening degree of the bleed valve (9) from a closed state to an open state with a prescribed opening degree (Vc), and the fuel control unit (3) controls the fuel regulating valve (83) such that the acquired flame temperature (Tf) falls within a predetermined temperature range defined by an upper limit value (Lu) and a lower limit value (Ll).

With the above configuration (9), the same effect as the above configuration (1) is achieved.

REFERENCE SIGNS LIST

1 Combustion control device
10 Combustion control program
11 Processor
12 Storage device
2 Bleed valve control unit
3 Fuel control unit

The invention claimed is:

1. A combustion control device for a gas turbine for supplying, to a combustor, compressed air by a compressor flowing into a casing, the device comprising:
a memory configured to store a program; and
a hardware processor configured to execute the program and control the combustion control device to:
control a bleed valve disposed on a bleed pipe for performing bleeding so that a part of the compressed air flowing into the casing is not used as combustion air in the combustor;
control a fuel regulating valve for regulating a fuel flow rate of fuel supplied to the combustor; and
acquire a flame temperature of flame caused by combustion of the fuel in the combustor,
wherein, upon reception of a load rejection signal for cutting off a load from the gas turbine, the hardware processor is configured to execute the program and control the combustion control device to control a valve opening degree of the bleed valve from a closed state to an open state with a prescribed opening degree, and control the fuel regulating valve such that the acquired flame temperature falls within a predetermined temperature range defined by an upper limit value and a lower limit value,
wherein the combustor is connected to a plurality of fuel systems including a main fuel system for supplying premixed fuel of the fuel and the combustion air at a flow rate according to a load of the gas turbine to the combustor by using a plurality of fuel nozzles,
wherein the hardware processor is configured to execute the program and further control the combustion control device for deciding the prescribed opening degree, and
wherein the deciding of the prescribed opening degree includes:
to acquire the number of fuel nozzles in the main fuel system used after the reception of the load rejection signal; and
to decide the prescribed opening degree of the bleed valve based on the number of used fuel nozzles.

2. The combustion control device for the gas turbine according to claim 1,
wherein the combustor includes a first cylindrical portion for generating a combustion gas by combusting the fuel and the compressed air, and wherein the hardware processor is configured to execute the program and further control the combustion control device to:

calculate a flow rate of the combustion air supplied into the first cylindrical portion, based on the valve opening degree of the bleed valve; and calculate an estimate value of the flame temperature, based on the flow rate of the combustion air and a fuel flow rate of the fuel each of which is supplied into the first cylindrical portion.

3. The combustion control device for the gas turbine according to claim 1, wherein the hardware processor is configured to execute the program and further control the combustion control device for deciding a prescribed opening degree, wherein the deciding of the prescribed opening degree includes deciding the prescribed opening degree of the bleed valve based on the flame temperature or a load reference value of the gas turbine when the load rejection signal is received.

4. The combustion control device for the gas turbine according to claim 3, wherein the combustor is connected to a plurality of fuel systems including a pilot fuel system, and wherein the hardware processor is configured to execute the program and further control the combustion control device to:

decide a reference opening degree of the fuel regulating valve in the pilot fuel system in accordance with an operating condition of the gas turbine, upon the reception of the load rejection signal; and add an additional opening degree to the reference opening degree, in a low load where the load reference value of the gas turbine when the load rejection signal is received is lower than a rated load reference value.

5. The combustion control device for the gas turbine according to claim 1, wherein the prescribed opening degree is full opening.

6. The combustion control device for the gas turbine according to claim 1, wherein the upper limit value is a temperature at which damage to the gas turbine due to the flame is preventable, and wherein the lower limit value is a temperature at which flame off of the flame is preventable.

7. A combustion control method for a gas turbine for supplying, to a combustor, compressed air by a compressor flowing into a casing, the method comprising:

a bleed valve control step of controlling a bleed valve disposed on a bleed pipe for performing bleeding so that a part of the compressed air flowing into the casing is not used as combustion air in the combustor;

a fuel control step of controlling a fuel regulating valve for regulating a fuel flow rate of fuel supplied to the combustor; and a temperature acquisition step of acquiring a flame temperature of flame caused by combustion of the fuel in the combustor, wherein, upon reception of a load rejection signal for cutting off a load from the gas turbine, the bleed valve control step includes controlling a valve opening degree of the bleed valve from a closed state to an open state with a prescribed opening degree, and the fuel control step includes controlling the fuel regulating valve such that the acquired flame temperature falls within a predetermined temperature range defined by an upper limit value and a lower limit value, wherein the combustor is connected to a plurality of fuel systems including a main fuel system for supplying premixed fuel of the fuel and the combustion air at a flow rate according to a load of the gas turbine to the combustor by using a plurality of fuel nozzles, and wherein the method further comprises a step of deciding the prescribed opening degree including:

a step of acquiring the number of fuel nozzles in the main fuel system used after the reception of the load rejection signal; and a step of deciding the prescribed opening degree of the bleed valve based on the number of used fuel nozzles.

8. A computer-readable storage medium for storing a combustion control program for a gas turbine for supplying, to a combustor, compressed air by a compressor flowing into a casing, the combustion control program when executed by a computer performs steps comprising:

controlling a bleed valve disposed on a bleed pipe for performing bleeding so that a part of the compressed air flowing into the casing is not used as combustion air in the combustor;

controlling a fuel regulating valve for regulating a fuel flow rate of fuel supplied to the combustor; and acquiring a flame temperature of flame caused by combustion of the fuel in the combustor, wherein, upon reception of a load rejection signal for cutting off a load from the gas turbine, the combustion control program causes the computer to control a valve opening degree of the bleed valve from a closed state to an open state with a prescribed opening degree, and control the fuel regulating valve such that the acquired flame temperature falls within a predetermined temperature range defined by an upper limit value and a lower limit value, wherein the combustor is connected to a plurality of fuel systems including a main fuel system for supplying premixed fuel of the fuel and the combustion air at a flow rate according to a load of the gas turbine to the combustor by using a plurality of fuel nozzles, and wherein the steps further comprise a step of deciding the prescribed opening degree including:

acquiring the number of fuel nozzles in the main fuel system used after the reception of the load rejection signal; and deciding the prescribed opening degree of the bleed valve based on the number of used fuel nozzles.

* * * * *